United States Patent [19]

Leroux

[11] 4,198,783
[45] Apr. 22, 1980

[54] HYDROPONIC APPARATUS

[76] Inventor: Frank W. Leroux, 5575 Williamsdale Ct., Seminole, Fla. 33541

[21] Appl. No.: 851,043

[22] Filed: Nov. 14, 1977

[51] Int. Cl.$^2$ .................. A01G 31/02; A01G 9/16; A01G 9/24
[52] U.S. Cl. ........................... 47/60; 47/17; 47/19; 47/62; 47/69; 47/79
[58] Field of Search ............ 47/17, 19, 59–64, 47/79, 80, 1, 31, 26, 28 R, 69

[56] References Cited

U.S. PATENT DOCUMENTS

| 119,242 | 9/1871 | Pleasonton | 47/17 |
|---|---|---|---|
| 800,746 | 10/1905 | Landon | 47/31 X |
| 841,306 | 1/1907 | Bender et al. | 47/17 |
| 1,005,078 | 10/1911 | Schwarz | 47/17 |
| 1,245,441 | 11/1917 | Cook | 47/31 |
| 1,432,339 | 10/1922 | Jones | 47/28 R |
| 2,002,380 | 5/1935 | Wernicke et al. | 47/69 |
| 2,121,461 | 6/1938 | Widmann | 47/16 UX |
| 2,198,150 | 4/1940 | Barnhart | 47/64 X |
| 2,296,860 | 9/1942 | Martin | 47/19 |
| 2,592,976 | 4/1952 | Thomas | 47/19 X |
| 2,777,253 | 1/1957 | Bensin | 47/1 |
| 2,963,819 | 12/1960 | Hoch | 47/17 |
| 3,095,670 | 7/1963 | Raab | 47/17 |
| 3,323,253 | 6/1967 | Robins | 47/79 X |
| 3,451,162 | 6/1969 | Rasmussen | 47/79 X |
| 3,667,158 | 6/1972 | Privett | 47/17 |
| 3,841,023 | 10/1974 | Carlyon, Jr. | 47/16 X |
| 3,869,827 | 3/1975 | Anderson et al. | 47/17 |
| 3,896,586 | 7/1975 | Caldwell | 47/28 R |
| 3,992,809 | 11/1976 | Chew | 47/80 X |
| 4,051,626 | 10/1977 | Trumley et al. | 47/19 X |
| 4,055,030 | 10/1977 | Earnshaw | 47/17 X |

FOREIGN PATENT DOCUMENTS

| 857501 | 9/1940 | France | 47/19 |
|---|---|---|---|
| 1170246 | 1/1959 | France | 47/64 |
| 1400547 | 4/1965 | France | 47/17 |
| 4469 | of 1896 | United Kingdom | 47/17 |

*Primary Examiner*—Edgar S. Burr
*Assistant Examiner*—Steven A. Bratlie
*Attorney, Agent, or Firm*—Arthur W. Fisher, III

[57] ABSTRACT

An enclosed hydroponic apparatus comprising a free standing reinforced base housing a nutrient feed supply including a temperature control device to partially control the temperature within the hydroponic apparatus, a plant enclosure including a frame to support a plurality of partitions attached to the upper portion of the free standing reinforced base and a plurality of frosted, convex light absorbing elements mounted on the upper portion of the frame to intercept and direct light to the plants disposed within the plant enclosure.

13 Claims, 4 Drawing Figures

U.S. Patent  Apr. 22, 1980  4,198,783
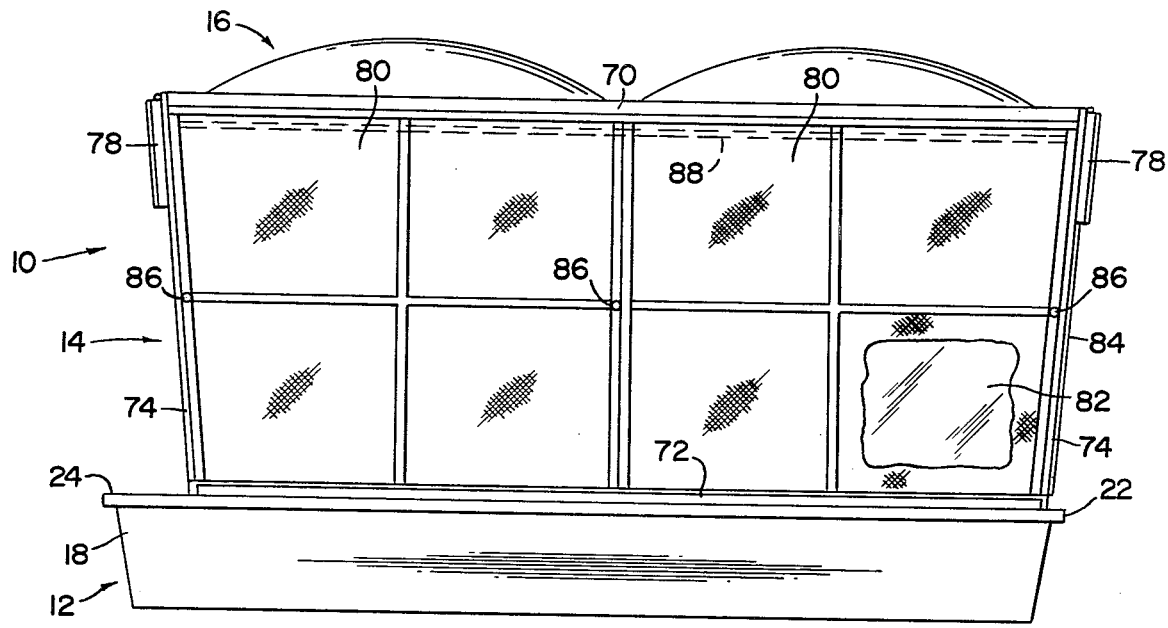
FIG. 1
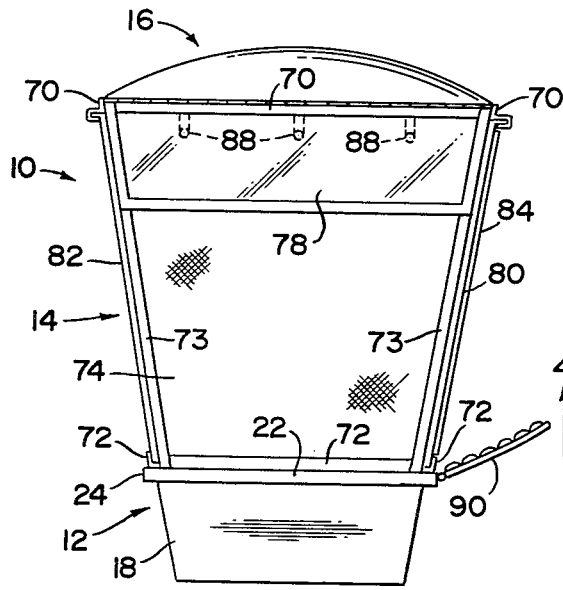
FIG. 2
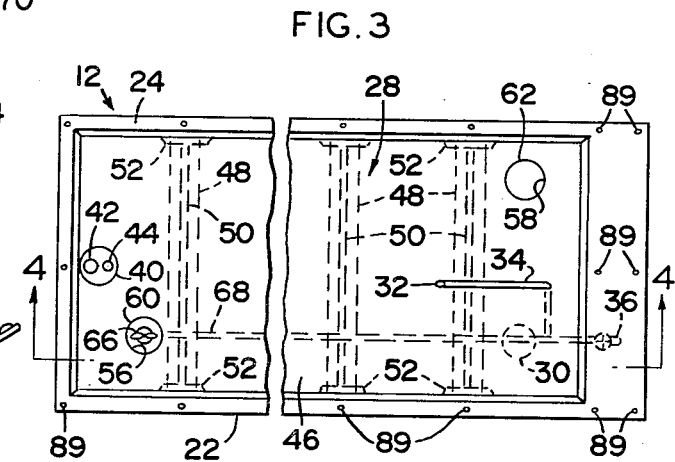
FIG. 3
FIG. 4

HYDROPONIC APPARATUS

BACKGROUND OF THE INVENTION

1. Field of the Invention

An enclosed hydroponic apparatus specifically configured to provide a closed, self-sustaining system.

2. Description of the Prior Art

The prior art discloses a number of hydroponic devices. For example, U.S. Pat. No. 3,667,158 shows a combined humidifier and plant apparatus including a first compartment, water trough being provided in the first compartment and a tray arranged to cover the water trough and for supporting a layer of soil above the trough. A second compartment is provided to receive a quantity of water. An immersion heater is located in the second compartment. A fan is positioned so as to drive air and water vapor across the surface of the water in the second compartment humidify the ambient atmosphere.

U.S. Pat. No. 3,451,162 illustrates a hydroponic apparatus including a housing means for forming a nutrient solution storage chamber. Pump means provided in the housing to pump the nutrient solution from the storage chamber to a supporting means holding the roots of the plants positioned within the housing means. Radiation means may also be provided in the housing means.

Additional examples of the prior art are found in U.S. Pat. Nos. 2,306,027; 3,095,670; 3,323,253; and 3,543,437.

SUMMARY OF THE INVENTION

The present invention relates to an enclosed hydroponic apparatus. More specifically, the hydroponic apparatus comprises a free standing, reinforced base, a plant enclosure to house plants therein attached to the upper portion of the free standing, reinforced base and a plurality of light absorbing elements mounted on the upper portion of the plant enclosure to direct light to the plants disposed within the plant enclosure.

The free standing, reinforced base comprises a substantially rectangular lower tray having a horizontally disposed ledge formed about the upper periphery thereof and a substantially rectangular upper tray having an L-shaped ledge formed about the upper periphery thereof configured to engage the lower ledge to cooperatively form a nutrient compartment between the upper and lower trays. The upper tray includes a plant compartment. A nutrient feed supply is operatively housed within the free standing, reinforced base. More particularly, the nutrient feed supply comprises a pump disposed within the nutrient compartment to feed nutrient therefrom to a substantially vertical feed pipe disposed within the plant compartment. A nutrient return means is formed at the opposite end of the upper tray to return nutrient therefrom to the nutrient compartment.

The plant enclosure comprises a frame to support a plurality of screen partitions to protect plants disposed therein. The frame comprises upper and lower channels to slidably support the screen panels along the length of the free standing, reinforced base to permit access into the interior of the plant enclosure.

The light absorbing elements each comprise a frosted, convex member to optimize light absorption.

In use inert material is used to fill the interior of the upper tray. In operation nutrient is fed from the nutrient compartment by the pump actuated either manually or through a timer coupled to an external electrical source. As the nutrient is fed into the upper tray, the nutrient is fed through the material to the roots of the plants within the material. Due to the diagonal slant of the bottom wall of the upper tray, the nutrient is returned through the nutrient return means to the nutrient compartment.

As previously discussed the side partitions are slidably disposed within channels to permit access into the interior of plant enclosure. The cross-sectional dimension of the lower side channels or separation therebetween permits exposure of all the plants within the plant enclosure for maintenance and picking while the cross-sectional dimension of the upper channels permit optimum light absorption through the dimension of the frosted, convex members.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 1 is a side view of an enclosed hydroponic system.

FIG. 2 is an end view of the enclosed hydroponic system.

FIG. 3 is a top view of a free standing, reinforced base.

FIG. 4 is a cross-sectional side view of the free standing reinforced base taken along line 4—4 of FIG. 3.

Similar reference characters refer to similar parts throughout the several views of the drawings.

DETAILED DESCRIPTION OF THE PREFERRED EMBODIMENT

As shown in FIGS. 1 and 2, the present invention comprises an enclosed hydroponic apparatus generally indicated as 10 specifically configured to provide a closed, self-sustaining system. The hydroponic apparatus 10 comprises a free standing, reinforced base generally indicated as 12, a plant enclosure generally indicated as 14 and a plurality of light absorbing elements each generally indicated as 16.

As best shown in FIGS. 3 and 4, the free standing, reinforced base 12 comprises a substantially rectangular lower tray 18 having a substantially horizontal ledge 20 formed about the upper periphery thereof and a substantially rectangular upper tray 22 having a corresponding L-shaped ledge 24 formed about the upper periphery thereof configured to engage the lower ledge 20 to cooperatively form a nutrient compartment 26 between the lower and upper trays 18 and 22 respectively. The upper tray 22 includes a plant compartment 28. A nutrient feed supply is operatively housed within the free standing, reinforced base 12. More particularly, the nutrient feed supply comprises a pump 30 disposed within the nutrient compartment 26 to feed nutrient therefrom to a substantially vertical feed pipe 32 coupled to the pump 30 by feed conduit 34. The nutrient compartment 26 may be evacuated by opening the faucet 36 and operating the pump 30. As more fully described hereinafter, the pump 30 may be actuated manually or automatically through timer 38 coupled to an electrical source (not shown). The nutrient feed supply further includes a nutrient return means comprising strainer 40 having a stand pipe 42 disposed therein to control the maximum depth of the nutrient within the upper tray 22 in combination with a drain 44 formed in the lower portion of bottom wall 46 such that the interior of upper tray 22 is in open communication with the nutrient compartment 26. It should be noted that the bottom wall 46 extends diagonally downward toward the return end of the upper tray 22 to facilitate dispersion of the nutrient from feed pipe 36 as well as return nutrient to nutrient compartment 26 as more fully described hereinafter. It should be noted that the feed end of the upper tray 22 is approximately six inches in depth while the return is approximately eight inches in depth.

As best shown in FIG. 4 the upper tray 22 includes a plurality of reinforcing ribs 48 and support means comprising a laterally extending support member 50 in combination with substantially vertical support means 52 formed in the interior of the lower tray 18. This is essential inasmuch as the upper tray 22 by design necessarily supports at least twenty-two hundred pounds of inert material (gravel) in addition to the weight of the plants and nutrient/water solution during operation. To further accomplish the self-sustaining feature of the subject invention, a heater system to control the heat within the plant enclosure 14 within a predetermined range is provided. Specifically a heater 54 is disposed within the nutrient compartment 26 which in combination with inlet and outlet heat ports 56 and 58 respectively formed in bottom wall 46 provide for circulation of heated air through the entire device. Inlet and outlet heat channels 60 and 62 extend upwardly from ports 56 and 58 respectively. A temperature sensor 64 is coupled to the heater 54 to actuate the heater 54 at a predetermined temperature. In addition, a fluid powered fan 66 coupled to the pump 30 through second feed conduit 68 is disposed immediately below inlet port 56 to assist the movement of heated air.

As best shown in FIGS. 1 and 2, the plant enclosure 14 comprises a frame to operatively support a plurality of partitions to protect the plants (not shown) disposed therein. More specifically, the frame comprises upper and lower channels 70 and 72 respectively extending across the sides and ends of the plant enclosure 14. The end partitions 74 are fixedly attached between upper and lower channels 70 and 72 respectively while the side partitions as more fully described hereinafter are slidably disposed within upper and lower channels 70 and 72 respectively to permit access into the entire interior of the plant enclosure 14. Upper and lower channels 70 and 72 are held in fixed spaced relation by upright members 73. The end partitions 74 comprise screen panels. In addition, an upper panel 78 is hingedly attached to the upper portion of the frame. The side partitions comprise a first and second panel member 80 and 82 disposed on opposite sides of the frame. The first panel members 80 comprise screen panel members while the second panel members 82 comprise non porous, frosted panel members. Secondary protection panels 84 are selectively used to cover the screen panels 74 and 80 by fasteners (not shown) on the frame in relatively cold weather. The partitions are interlocked by lock means or latches 86. The frame further includes plant supports 88 comprising a plurality of support elements extending longitudinally along the upper portion of the frame.

It should be further noted that the lower channels 72 provide addition reinforcement and support to the base 12 by fastening means 89 fixedly coupled the upper and lower ledges 20 and 24 respectively to the lower channels 72 themselves. Of particular importance and note is the relative distance between opposite upper and lower channels 72 and 70 respectively. Specifically the width or distance between the lower channels 72 is at least 24 inches while the width or distance between the upper channels 70 is at least twice the distance between the lower channels 72. A reflector 90 may be hingedly attached along the side of the frame to reflect light in the plant enclosure 14.

The light absorbing elements 16 each comprise a frosted, convex member to optimize light absorption. It should be noted that the task is to optimize light absorption. The convex element is at least six feet in width and twelve inches in radial curvature forming a bubble-like member.

In use, inert material is used to fill the interior of the upper tray 22. The inert material is held away from the stand pipe 42 and drain 44 by strainer 40. In operation nutrient is fed from the nutrient compartment 26 by pump 30 actuated either manually or through the timer 38, coupled to an external electrical source (not shown). As the nutrient is fed into the upper tray 22, the nutrient is fed through the material to the roots of the plants (not shown). Due to the slant of the diagonal bottom wall 46, the nutrient is returned through drain 44. In the event there is a surge of nutrient in the upper tray 22 and reaches the upper portion of the stand pipe 42, the nutrient spills over into the stand pipe 42 and is returned directly to the nutrient compartment 26 to control the maximum depth of the nutrient within the material and upper tray 22. When the temperature within the plant enclosure 14 reaches a predetermined temperature such as 50° degrees the heater 52 is actuated through sensor 64 to heat the nutrient solution within the nutrient compartment 26 causing it to rise through inlet heat port 56 circulating through the plant enclosure 14 and returning to the nutrient compartment 36 through outlet heat port 58. It should be noted that both the nutrient and air are heated.

In warmer weather, the second panel members 82 are placed on the north side of the apparatus 10 with the first panel members 80 on the opposite side. In colder weather the first and second panel members 80 and 82 respectively are exchanged. In addition, the secondary protection panels 84 may be placed over screen panels 74 and 80 to protect the plants from the weather. To prevent over heating, upper panel 78 may be opened to circulate a limited amount of air through the plant enclosure 14.

As previously discussed the side partitions are slidably disposed within channels 70 and 72 to permit access into the interior of plant enclosure 14. The cross-sectional dimension of the lower side channels 72 or separation therebetween permits exposure of all the plants (not shown) within the plant enclosure 14 for maintenance and picking while the cross-sectional dimension of the upper channels 70 permits optimum light absorption through the dimension of the frosted convex members or elements 16.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. An enclosed hydroponic apparatus for the use in growing plants comprising a free standing reinforced base including a substantially rectangular lower tray comprising a bottom wall having side walls extending upwardly therefrom and a substantially rectangular upper tray including a bottom wall having side walls extending upwardly therefrom comprising a plant compartment operatively coupled to the upper portion of said side walls of said substantially rectangular lower tray to cooperatively form a nutrient compartment therebetween, a nutrient feed supply disposed in said substantially rectangular lower tray, a plant enclosure including a frame to support a plurality of partitions attached to the upper portion of said side walls of said lower tray said frame comprises a pair of upper and lower channels disposed on opposite sides of said enclosed hydroponic apparatus held in fixed spaced relationship relative to each other by upright members extending therebetween, end partitions fixedly attached to said upper and lower channels and side panels comprising of first and second panel members disposed on opposite sides of said frame slidably attached to said upper and lower channels, the distance between said pair of upper channels being substantially greater than the distance between said pair of lower channels such that said first and second panel members diverge outwardly from said lower channels to said corresponding upper channels, a heater system including a heater disposed within said nutrient compartment in combination with an inlet and outlet heat ports formed in opposite ends of said upper tray and an inlet and outlet heat channel extending upwardly from said inlet and outlet ports respectively into said plant enclosure to provide circulation of heated air by convection through said plant enclosure and at least one convex light absorbing element comprising a frosted bubble-like member mounted on the upper portion of said frame to intercept and direct light to the plants disposed within said plant enclosure.

2. The enclosed hydroponic apparatus of claim 1 wherein said nutrient feed supply comprises a pump disposed within said nutrient compartment and a feed pipe coupled to said pump through a feed conduit to supply nutrient from said nutrient compartment to said plant compartment.

3. The enclosed hydroponic apparatus of claim 2 wherein said nutrient feed supply further includes a nutrient returns means formed in said plant compartment comprising a strainer including a drain in communication with said nutrient compartment to return nutrient thereto and a stand pipe disposed into said strainer in communication with said nutrient compartment to control the maximum depth of the nutrient within said plant compartment.

4. The enclosed hydroponic apparatus of claim 3 wherein said bottom wall of said upper tray extends diagonally downward toward said drain to facilitate dispersion of the nutrient from said feed pipe.

5. The enclosed hydroponic apparatus of claim 4 wherein said nutrient supply means further includes a timer coupled to said pump to selectively actuate said pump.

6. The enclosed hydroponic apparatus of claim 1 wherein said frame further includes a plurality of plant support elements extending longitudinally along the upper portion of said frame.

7. The enclosed hydroponic apparatus of claim 1 wherein said lower channels are coupled to said substantially horizontal ledge of said lower tray and substantially L-shaped ledge of said upper tray to fixedly couple said upper and lower ledges.

8. The enclosed hydroponic apparatus of claim 1 wherein said end partitions comprise screen panels and further include an upper panel hingedly attached to said upper channels.

9. The enclosed hydroponic apparatus of claim 1 wherein said frame member further includes a reflector hingedly attached along the side of said frame to reflect light into said plant enclosure.

10. The enclosed hydroponic apparatus of claim 1 wherein said substantially rectangular lower tray includes a substantially horizontal ledge formed about the upper periphery of said side walls and said substantially rectangular upper tray includes a corresponding L-shaped ledge formed about the upper periphery of said side walls of said upper tray specifically configured to engage said lower ledge.

11. The enclosed hydroponic apparatus of claim 10 wherein said upper tray further includes a plurality of reinforcing ribs extending across the width of said upper tray.

12. The enclosed hydroponic apparatus of claim 1 wherein said first panel members comprises screen panel members and said second panel members comprises non-porous frosted panel members.

13. The enclosed hydroponic apparatus of claim 12 wherein said frame further includes secondary protection panel selectively attachable to said frame to cover said screen panels during cold weather.

* * * * *